United States Patent
Darcy (10) Patent No.: US 10,108,500 B2
(45) Date of Patent: Oct. 23, 2018

(54) REPLICATING A GROUP OF DATA OBJECTS WITHIN A STORAGE NETWORK

(75) Inventor: Jeffrey Darcy, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 886 days.

(21) Appl. No.: 12/956,527

(22) Filed: Nov. 30, 2010

(65) Prior Publication Data

US 2012/0136828 A1  May 31, 2012

(51) Int. Cl.
*G06F 17/30* (2006.01)
*G06F 11/14* (2006.01)

(52) U.S. Cl.
CPC ............................ *G06F 11/1464* (2013.01)

(58) Field of Classification Search
CPC ......... G06F 17/30578; G06F 17/30581; G06F 17/30082; G06F 11/1446; G06F 17/2229; G06F 17/241; G06F 17/30575; G06F 17/30345; G06F 3/0683
USPC .......................... 707/661, 662, 663, 665, 666
See application file for complete search history.

(56) References Cited

U.S. PATENT DOCUMENTS

| | | | |
|---|---|---|---|
| 6,415,828 B1 | 7/2002 | Mukherjea et al. | |
| 6,512,850 B2 | 1/2003 | Yaung | |
| 6,941,321 B2 | 9/2005 | Schuetze et al. | |
| 7,099,860 B1 | 8/2006 | Liu et al. | |
| 7,165,080 B2 | 1/2007 | Kotcheff et al. | |
| 7,325,019 B2 | 1/2008 | Lam et al. | |
| 7,500,053 B1 * | 3/2009 | Kavuri et al. | 711/114 |
| 7,509,409 B2 | 3/2009 | Penny et al. | |
| 7,725,444 B2 | 5/2010 | Devarakonda et al. | |
| 7,769,722 B1 * | 8/2010 | Bergant et al. | 707/681 |
| 7,778,984 B2 | 8/2010 | Zhang et al. | |
| 7,809,914 B2 | 10/2010 | Kottomtharayil et al. | |
| 7,904,423 B2 | 3/2011 | Vermeulen et al. | |
| 8,010,498 B2 | 8/2011 | Gounares et al. | |
| 8,121,966 B2 | 2/2012 | Routray | |
| 8,352,424 B2 | 1/2013 | Zunger et al. | |
| 2004/0205629 A1 | 10/2004 | Rosenholtz et al. | |
| 2005/0203908 A1 * | 9/2005 | Lam | H04L 41/0893 |
| 2006/0236061 A1 | 10/2006 | Koclanes | |
| 2007/0022129 A1 | 1/2007 | Bahar et al. | |
| 2007/0133947 A1 | 6/2007 | Armitage et al. | |

(Continued)

OTHER PUBLICATIONS

Jeffrey Darcy et al., Systems and Methods for Replicating Data Objects Within a Storage Network Based on Resource Attributes. U.S. Appl. No. 12/957,183, filed Nov. 30, 2010.

(Continued)

*Primary Examiner* — Scott A. Waldron
*Assistant Examiner* — Fatima P Mina
(74) *Attorney, Agent, or Firm* — Lowenstein Sandler LLP (57) ABSTRACT

Embodiments relate to systems and methods for replicating a group of data objects within a storage network. In particular, a module can designate an object in the storage network as an anchor object. The module can further evaluate a replication policy of the anchor object to determine a destination resource on which to replicate a related group of data objects. Further, the module can located the related group of data objects, and define a replication policy on each of the data objects that specifies that each of the data objects follow the anchor object. The module can replicate each of the data objects as well as the anchor object on the destination resource.

22 Claims, 5 Drawing Sheets

(56) References Cited

U.S. PATENT DOCUMENTS

| | | | |
|---|---|---|---|
| 2007/0214183 A1 | 9/2007 | Howe et al. | |
| 2008/0136897 A1* | 6/2008 | Morishima et al. | 348/14.08 |
| 2008/0198752 A1 | 8/2008 | Fan et al. | |
| 2009/0083738 A1* | 3/2009 | Kruglick et al. | 718/100 |
| 2010/0040796 A1 | 2/2010 | Chueh | |
| 2010/0100529 A1* | 4/2010 | Erofeev | 707/610 |
| 2010/0274762 A1 | 10/2010 | Murphy et al. | |
| 2011/0040792 A1 | 2/2011 | Perry | |
| 2011/0125704 A1 | 5/2011 | Mordvinova et al. | |
| 2011/0161294 A1 | 6/2011 | Vengerov et al. | |
| 2011/0196664 A1 | 8/2011 | Zunger et al. | |
| 2011/0196830 A1 | 8/2011 | Zunger et al. | |
| 2011/0196831 A1 | 8/2011 | Zunger et al. | |
| 2011/0196832 A1 | 8/2011 | Zunger et al. | |
| 2011/0196873 A1 | 8/2011 | Kesselman | |
| 2012/0036105 A1 | 2/2012 | Souza et al. | |
| 2013/0091534 A1 | 4/2013 | Gilde et al. | |

OTHER PUBLICATIONS

USPTO Office Action for U.S. Appl. No. 12/957,183, dated Nov. 17, 2014.
USPTO Office Action for U.S. Appl. No. 12/957,183, dated Sep. 8, 2014.
USPTO Office Action for U.S. Appl. No. 12/957,183, dated May 27, 2014.
USPTO Office Action for U.S. Appl. No. 12/957,183, dated Apr. 11, 2013.
USPTO Office Action for U.S. Appl. No. 12/957,183, dated Feb. 22, 2013.
USPTO Office Action for U.S. Appl. No. 12/957,183, dated Sep. 26, 2012.
USPTO Office Action for U.S. Appl. No. 12/957,183, dated Oct. 30, 2010.

* cited by examiner

REPLICATING A GROUP OF DATA OBJECTS WITHIN A STORAGE NETWORK

FIELD

The present teachings relate to systems and methods for replicating a group of data objects within a storage network, and more particularly to platforms and techniques for replicating data objects that follow an anchor object.

BACKGROUND OF RELATED ART

Data replication can be used to ensure consistency among software or hardware resources in a storage network. In operation, data on a primary server or device is backed up, or replicated, on a secondary file server or device. Therefore, if data is ever lost on the primary server, the replicated data can be recovered from the secondary server. The servers can be local or remote with respect to one another and can be connected via a network such as a local area network (LAN), wide area network (WAN), or metropolitan area network (MAN).

In services that require access to a group of data objects that have been replicated on various servers, it can sometimes prove difficult to aggregate the data objects in a common location or resource. In particular, each data object of the group can have a separate replication policy that can result in the data objects being replicated on separate destination resources. Therefore, the data objects of the group are difficult to locate and aggregate on a common resource. Further, existing platforms have to examine or evaluate each replication policy of the objects individually. As such, an administrator is forced to use the replication policies in accessing and retrieving data in operating specific services.

Therefore, it may be desirable to provide systems and methods for replicating a group of data objects on the same destination resource. In particular, it may be desirable to use a replication policy result from one data object to define a replication policy for the other data objects.

DESCRIPTION OF EMBODIMENTS

Embodiments of the present teachings relate to systems and methods for replicating a common group of data objects within a storage network. In particular, embodiments relate to platforms and techniques for using a replication policy result from one object to define a replication policy for related and/or additional data objects. In embodiments, an object in the storage network can be designated as an anchor object. A replication policy of the anchor object can be examined or evaluated to identify one or more destination locations or resources of the storage network. In embodiments, a set of data objects associated with the anchor object can identified, and can be configured to link to, or follow, the anchor object. In some embodiments, the systems and methods can define a replication policy for the set of data objects to specify that the set of data objects are to follow the anchor object. In embodiments, the systems and methods can replicate the set of data objects and/or the anchor object on the one or more destination locations.

Embodiments described herein can be implemented in or supported by a storage network architecture. In embodiments, the storage network can be a cloud-based network or can be a non-cloud-based network. As used herein, a "storage network" can be any network configured with storage resources such as, for example, servers, hard drives, virtual memory, databases, random access memory (RAM), cache memory, other memory, and any other resource configured to store data. The storage resources can be directly connected or connected via a network such as, for example, a cloud-based network, a local area network (LAN), wide area network (WAN), wireless network, virtual private network (VPN), storage area network (SAN), and other networks.

As used herein, "replication" can be any process that can be used to duplicate, copy, retrieve, or otherwise reproduce one or more data objects from one resource to another resource. The "primary" or "originating" resource can for instance refer to the resource from which the data objects are to be copied or retrieved, and the "secondary" or "destination" resource can for instance refer to the resource to which the data objects are to be copied, transmitted, moved, imaged, retrieved, and/or the like. Further, as used herein, a "data object" can for instance be any type of file, application, value, variable, function, data structure, or the like that can be read from and/or stored on a resource. Still further, as used herein, an "anchor object" can for instance be a data object, file, pseudo-object, and/or other entity that can comprise, store, or otherwise contain data as well as a replication policy. As used herein, a "user" can for instance refer a person, customer, subscriber, administrator, corporation, organization, or other entity accessing modules, inputting values, or overseeing functions associated with the storage network. In embodiments, the user can operate or manage computer software or hardware that can manage replication policies of data objects.

Further, as used herein, the term "follow" can for instance indicate an association between an anchor object and a set of data objects. In particular, a data object can be said to "follow" an anchor object if the data object comprises a link, a pointer, or another association to the anchor object. As used herein, a "result" of a replication policy can for instance be an indication of a destination resource or set of destination resources within a storage network on which an associated data object is to be replicated. Further, as used herein, a "service" can for instance refer to any operation or process that can require, benefit from, or otherwise need data objects being replicated or accessed from one or more storage network resources.

As used herein, a "cloud-based network" can for instance comprise a collection of resources that can be invoked to instantiate a virtual machine, process, or other resource for a limited or defined duration. In embodiments, the cloud-based network can be implemented as a software as a service (SaaS). For example, vendors such as independent software vendors (ISVs) can supply software resources for use with other resources in a cloud-based network. Resources in the cloud-based network can include any hardware, software, or communications resources, such as ports or channels provided to a virtual machine or other machine or process in the cloud. Resources can likewise include services, such as Web-based services deployed in the cloud, for example security or identity management services and/or other resources.

Figure 1:
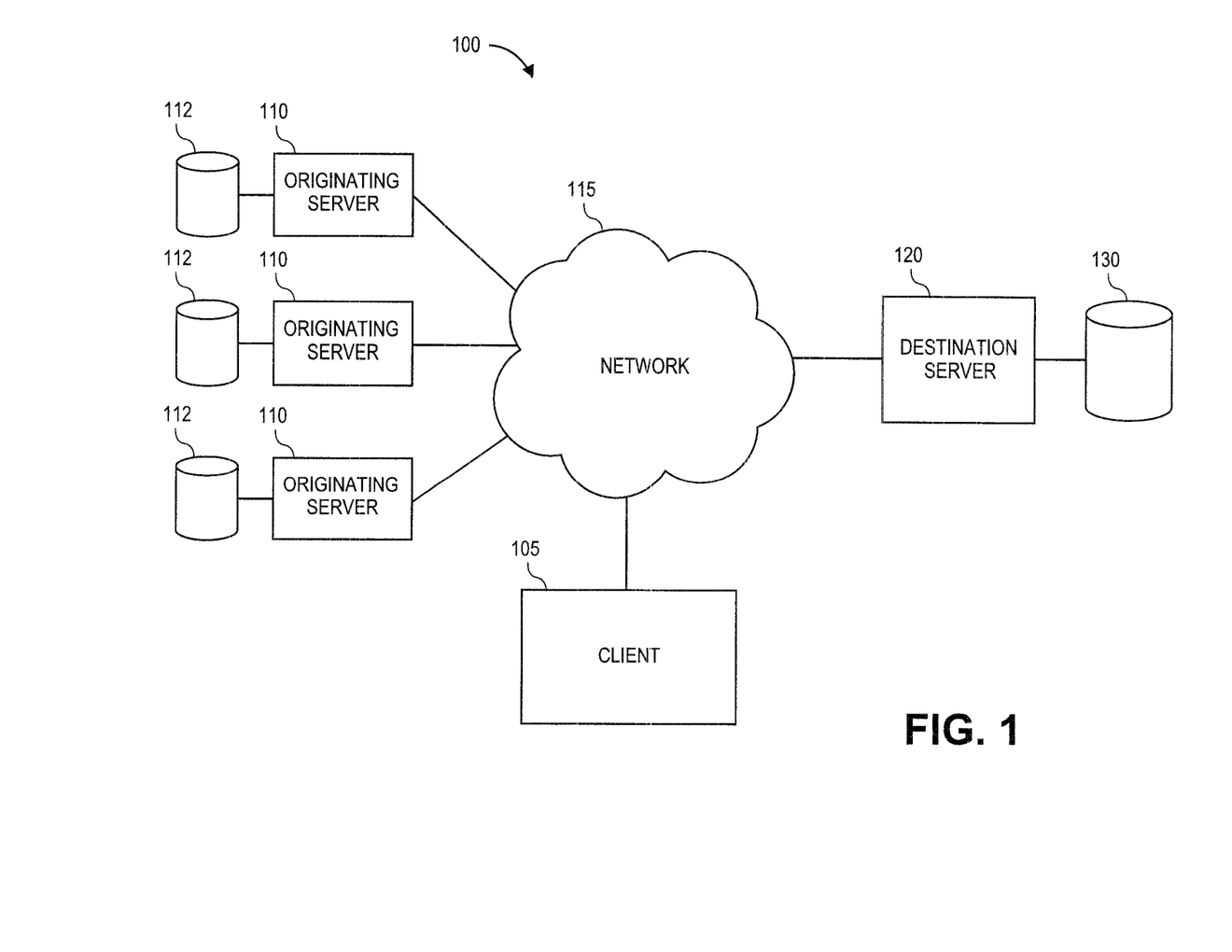
FIG. 1 illustrates an overall storage network architecture in which various embodiments of the present teachings can be practiced.

FIG. 1 illustrates an exemplary storage network 100 for facilitating data replication. The storage network 100 can comprise a client 105 coupled to a network 115. In embodiments, the network 115 can be cloud-based, or a LAN, WAN, MAN, or any other network. Further, in embodiments, the client 105 can be a personal computer (PC), workstation, cell phone, or other wired or wireless computing device capable of communicating data. The storage network 100 can further comprise a set of originating servers 110 that can connect to the client 105 either locally or through the network 115. The set of originating servers 110 can represent resources on which or to which data objects are replicated. In embodiments, the set of originating servers 110 can be coupled to a set of repositories 112. In embodiments, the set of originating servers 110 can comprise local storage configured to store data, and the set of repositories 112 can comprise any type of storage, and any multiple of resources, such as, for example, storage racks, hard drives, virtual memory, databases, random access memory (RAM), and other memory. In embodiments, the set of repositories 112 can be accessed by users or by software or applications independent from or associated with resources of the storage network 100. It should be appreciated that the set of originating servers 110, the set of repositories 112, or any other resource associated with the storage network 100 can be implemented in a cloud-based network.

The storage network 100 can further comprise a destination server 120 that can be coupled to the client 105 and the set of originating servers 110 either locally or via the network 115. In embodiments, the storage network 100 can comprise multiple destination servers 120. Although described herein as the destination server and the set of originating servers, it should be appreciated that the destination server and the set of originating servers can be interchangeable such that any server can be an originating or primary server, as well as a destination or secondary server. The destination server 120 can represent a data center and can be coupled to a destination repository 130 comprising any type of storage, and any multiple of resources such as, for example, data racks, hard drives, virtual memory, databases, random access memory (RAM), and other memory. The set of originating servers 110 can be configured to communicate data to the destination server 120 via the network 115. In embodiments, the communicated data can be data stored on the set of repositories 112 that is to be replicated on the destination repository 130 of the destination server 120.

Figure 2:
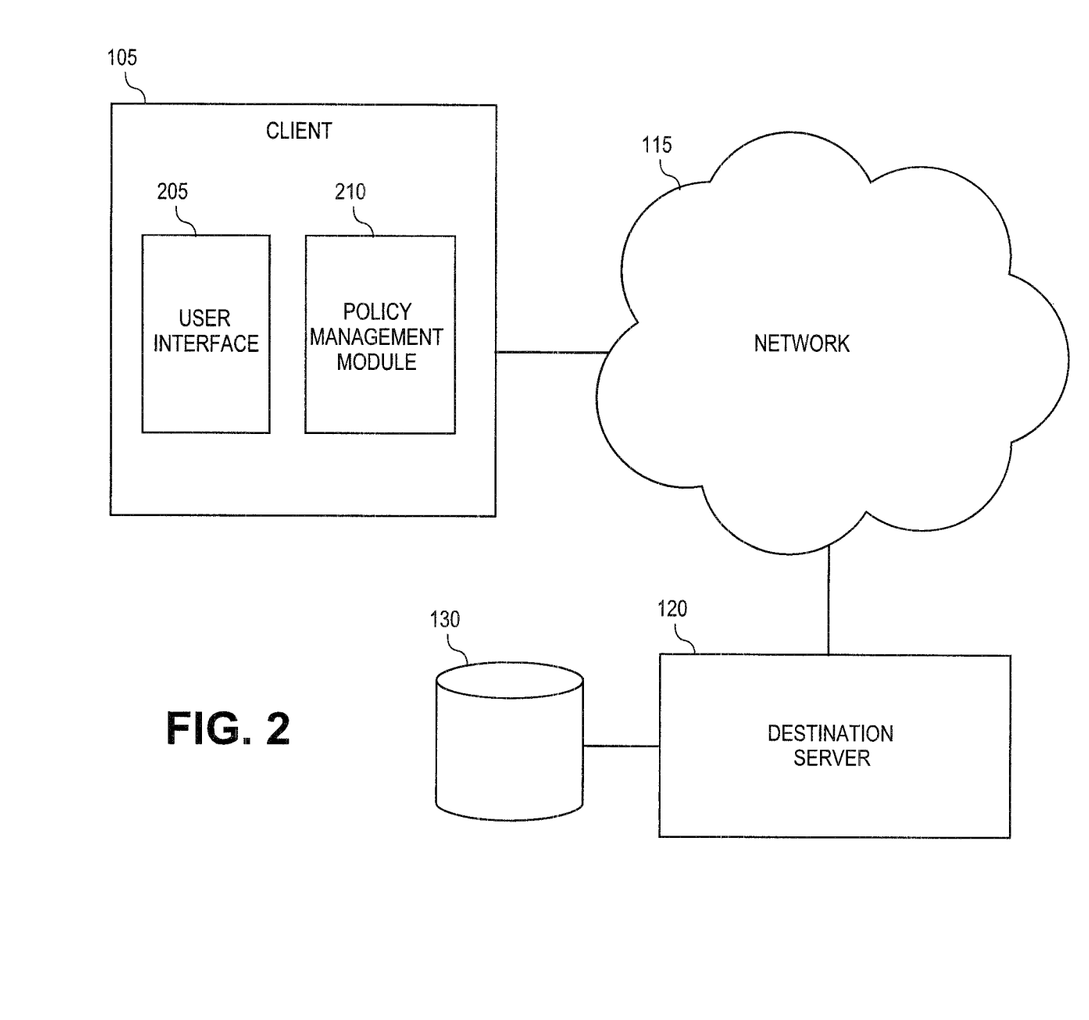
FIG. 2 illustrates an overall storage network architecture in which various embodiments of the present teachings can be practiced in another regard, according to various embodiments.

FIG. 2 illustrates an exemplary configuration that can be used in systems and methods for replicating a common group of data objects in a storage network. In embodiments as shown, the client 105 can comprise a user interface 205 and a policy management module 210. It should be also appreciated that the user interface 205 and the policy management module 210 as shown in FIG. 2 can be implemented in the client 105, the destination server 120, a combination thereof, or any other resource associated with the storage network 100.

In embodiments, the policy management module 210 can be configured to identify any object stored on any resource in the storage network 100 or another network. Further, the policy management module 210 can designate any object as an anchor object. In embodiments, the anchor object can comprise a replication policy. Further, in embodiments, the anchor object can be a real data object, and/or can be a policy holder that comprises the replication policy. In embodiments, the replication policy can be any policy that specifies a resource on which a data object can be replicated. Further, in embodiments, attributes associated with the storage network 100 can be determined and input into the replication policy to determine the destination resource.

The policy management module 210 can evaluate the replication policy of the anchor object to determine a policy result. In embodiments, the policy result can specify a destination resource, or a set of destination resources, on which to replicate a set of data objects associated with the anchor object. In embodiments, the policy management module 210 can determine the set of data objects that are associated with the anchor object. For example, the set of data objects can be image files, video files, audio files, other media files, and/or any other sort of data file. In some embodiments, the policy management module 210 can access a lookup table to determine the set of data objects. In other embodiments, each of the set of data objects can comprise a link, pointer, or reference that can refer to the anchor object. For example, the link can specify that each of the set of data objects is following the anchor object. In further embodiments, the policy management module 210 can define a replication policy for each of the set of data objects that can specify that the set of data objects follows the anchor object. In aspects, the policy management module 210 can define the policy even if the set of data objects have a policy of their own. Still further, in embodiments, the policy management module 210 can replace existing replication policies of the set of data objects with a replication policy that can specify that the set of data objects follows the anchor object. It should be appreciated that other techniques of determining the set of data objects and establishing replication policies for the set of data objects are envisioned.

In embodiments, the replication policy of the anchor object can reference the follower objects themselves. When the policy management module 210 or other logic examines, inserts, or updates any of the follower objects, and therefore detects the anchor object, the policy management module 210 can then evaluate the replication policy of the anchor object for a destination resource. In embodiments, the policy management module 210 can store the resulting destination resource with the anchor object for use by any other follower object, without the need to re-evaluate the replication policy.

In embodiments, the policy management module 210 can order the set of data objects based on one or more factors. For example, the factors can be cost, business units, data sizes, data names, data owners, locations, data functions, legal or regulatory jurisdictions, storage and data transfer capacities, security data, language support characteristics, and other factors. Further, in embodiments, the policy management module 210 can select any of the set of data objects to be replicated based on any or all of the factors.

In embodiments, the replication policy of the set of data objects can specify that the set of data objects is to be replicated on the resulting resource of the replication policy of the anchor object. For example, if an evaluation of the replication policy of the anchor object results in destination resource A, then any data objects with replication policies that follow the anchor object should be replicated on destination resource A. In embodiments, the policy management module 210 can replicate the set of data objects on the destination resource. Further, in embodiments, a notification of the destination resource, the replication policy, or any other information can be generated and provided to a user, in any way via any communication or network. Still further, in embodiments, the policy management module 210 can store the replicated set of data objects in a local cache or other memory for an indefinite period or until a user no longer needs the set of data objects.

As an example and as a merely exemplary application of systems and methods as described herein, graphics artists or other users may wish to render a scene for a television show or other media production. Further, various frames that are to make up the scene are stored on various resources of a storage network. The processing time and effort can be reduced when the various frames are located on a single or reduced amount of resources. Therefore, it may be desirable to the graphics artist to consolidate the frames by replicating the frames to or on a single destination resource, such as a rendering server. An associated replication system can identify an anchor object that can specify a replication policy. The replication system can evaluate the replication policy to determine a destination resource A on which a group of related frames should be replicated.

In such an application, the replication system can locate the group of related frames that are necessary to render the scene. For example, the replication system or other logic can examine a list to determine the group of related frames. The replication system can define a replication policy for each of the group of related frames to follow the anchor object. In embodiments, a new replication policy can be defined for each of the group of related frames, or the new replication policy can replace an existing policy on any of the group of related frames. The replication system can replicate each of the group of related frames on destination resource A. For example, the replication system can examine the new replication policy on the group of related frames to determine that the group of related frames follows the anchor object, which evaluated policy result is destination resource A. In embodiments, the replication system can replicate the anchor object on destination resource A.

Figure 3:
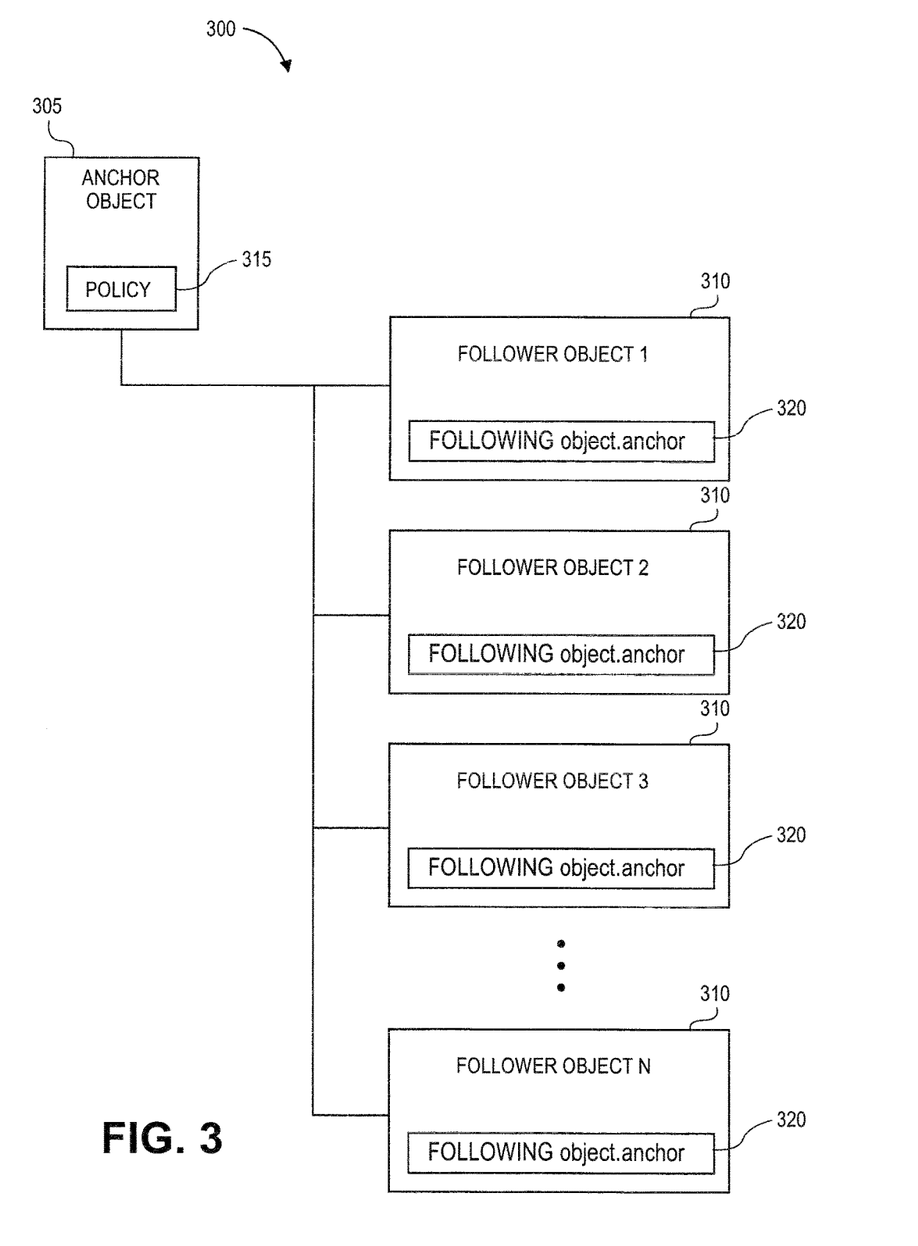
FIG. 3 illustrates an exemplary depiction of a group of data objects, according to various embodiments.

FIG. 3 is an exemplary depiction of a group of data objects 300. It should be appreciated that the group of data objects 300 are merely exemplary and other data objects are envisioned. As shown in FIG. 3, the group of data objects can comprise an anchor object 305 that can have an associated replication policy 315. In embodiments, the anchor object 305 can be a data object or can be a pseudo-object that holds the replication policy 315. In embodiments, the replication policy 315 can specify where to replicate data objects that follow or are related to the anchor object 305. In some embodiments, the policy management module 210 or other logic can evaluate the replication policy 315 to determine the resource on which to replicate the data objects.

The group of data objects 300 can further comprise a set of follower objects 310. In embodiments, each of the set of follower objects 310 can be related to one another, and can be related to the anchor object 305. For example, each of the set of follower objects 310 can correspond to data collected for a research project. In embodiments, each of the set of follower objects 310 can comprise a link 320 that can point to or otherwise reference the anchor object 305. In some embodiments, the link 320 can store a replication policy for the set of follower objects 310. As shown in FIG. 3, the link 320 can comprise an exemplary replication policy comprising the exemplary code snippet "FOLLOWING object.anchor". In embodiments, the exemplary replication policy can instruct a system module to replicate the set of follower objects 310 on a resource specified by the replication policy 315 of the anchor object 305. In embodiments, a system module can replicate the set of follower objects 310 and/or the anchor object 305 on the destination resource as specified by the replication policy 315. It should be appreciated that the replication policy 315 can specify a set of destination resources.

Figure 4:
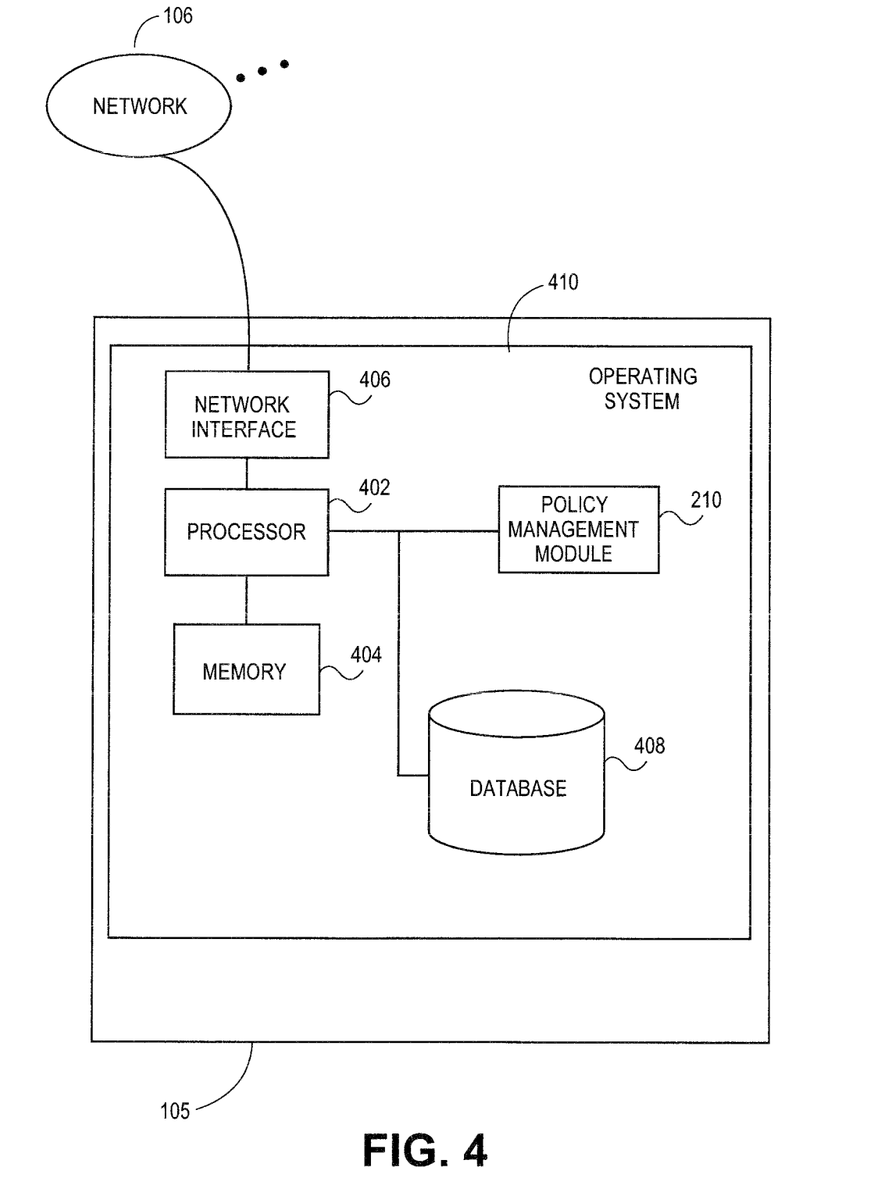
FIG. 4 illustrates an exemplary hardware configuration implemented in a storage network, according to various embodiments.

FIG. 4 illustrates an exemplary diagram of hardware and other resources that can be incorporated in the client 105 configured to communicate with the set of originating servers 110 and the destination server 120 (as shown in FIG. 1) via the one or more networks 115, according to embodiments. It should be understood that the resources can be implemented in other resources associated with the storage network 100. In embodiments as shown, the client 105 can comprise a processor 402 communicating with memory 404, such as electronic random access memory, operating under control of or in conjunction with an operating system 410. The operating system 410 can be, for example, a distribution of the Linux™ operating system, the Unix™ operating system, or other open-source or proprietary operating system or platform. The processor 402 can also communicate with one or more computer readable storage medium 408, such as hard drives, optical storage, databases, and the like. The processor 402 can further communicate with a network interface 406, such as an Ethernet or wireless data connection, which in turn communicates with the one or more networks 115, such as the Internet or other public or private networks.

The processor 402 can also communicate with the computer readable storage medium 408 and the policy management module 210, to execute control logic, generate a replication policy, replicate data objects according to the replication policy as described herein, and control the operation of the servers and other resources associated with the storage network 100. Other configurations of the client 105, associated network connections, and other hardware and software resources are possible.

Figure 5:
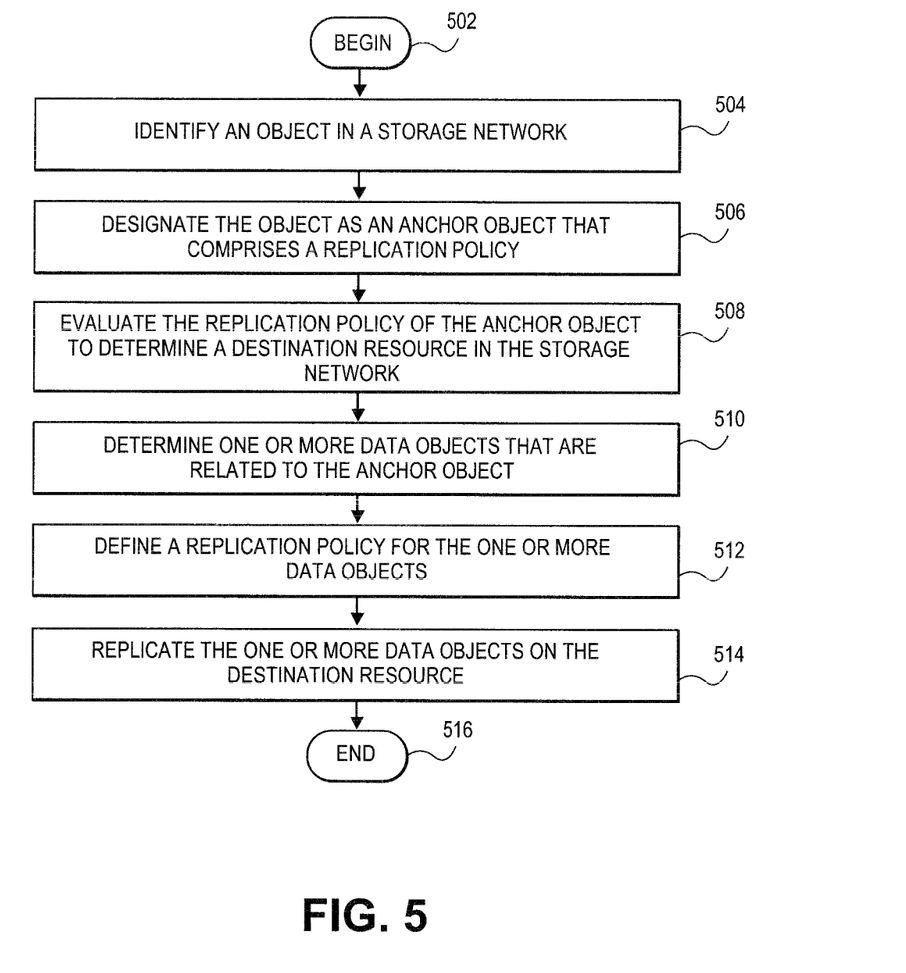
FIG. 5 illustrates a flowchart for replicating a group of data objects within a storage network, according to various embodiments.

FIG. 5 illustrates a flowchart for overall data replication of a common group of objects in a storage network, according to various embodiments. In embodiments, the data replication can be among local or remote resources in a storage network. In 502, processing can begin. In 504, an object within a storage network can be identified. In embodiments, the object can be detected on an originating resource within the storage network, and the object can be a real object or can be a pseudo-object comprising associated data. In 506, the object can be designated as an anchor object. In embodiments, the anchor object can have an associated replication policy.

In 508, the replication policy of the anchor object can be evaluated to determine a destination resource in the storage network on which to replicate any data objects associated with the anchor object. In embodiments, the replication policy can be evaluated in any way, using any attributes. In other embodiments, the replication policy can specify multiple destination resources of the storage network or other networks. In 510, one or more data objects that are related to the anchor object can be determined. In some embodiments, the policy management module 210 or other logic can examine a lookup table or other data structure to determine the one or more data objects. In other embodiments, the one or more data objects can comprise a link that can reference the anchor object.

In 512, a replication policy associated with the one or more data objects can be defined. In embodiments, the replication policy can specify for the one or more data objects to follow the anchor object. In other embodiments, the replication policy can explicitly specify that the one or more data objects are to be replicated on the destination resource. In 514, the one or more data objects can be replicated on the destination resource. In some embodiments, the anchor object can be replicated on the destination resource. In embodiments, the one or more data objects and/or the anchor object can be replicated in any way via any network. In 516, processing can end.

The foregoing description is illustrative, and variations in configuration and implementation may occur to persons skilled in the art. For example, while embodiments have been described which operate using one policy management module 210 and associated storage network 100, in embodiments, one or more of policy management module 210 and storage network 100, and/or other servers, data stores, and/or other logic or resources can be used. For further example, while embodiments have been described in which data replication policies are generated or modified, in embodiments, the data replication policies and resources associated with the policies can be modified or adjusted according to any combination and at any time or interval. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
   identifying an anchor object comprising a first replication policy;
   evaluating the first replication policy to determine a destination resource;
   detecting a data object associated with the anchor object, wherein the data object comprises a second replication policy;
   defining, by a processor, an additional replication policy for the data object to indicate that the data object is to follow the anchor object and that the data object is to be replicated on the destination source, wherein the additional replication policy is different from the second replication policy and the first replication policy;
   identifying, in view of the additional replication policy, a plurality of follower objects that follow the anchor object, the follower objects comprising the data object;
   ordering the follower objects in view of at least one factor to determine an order of the follower objects;
   selecting one or more of the follower objects in view of the order; and
   replicating, by the processor, the selected follower objects on the destination resource in view of the additional replication policy.

2. The method of claim 1, further comprising:
   replicating the anchor object on the destination resource in view of the additional replication policy.

3. The method of claim 1, wherein identifying the anchor object comprises:
   identifying an object in the storage network; and
   designating the object as the anchor object.

4. The method of claim 1, further comprising:
   generating a notification indicating the destination resource; and
   providing the notification to a user.

5. The method of claim 1, wherein identifying the follower objects comprises examining a lookup table associated with the additional replication policy.

6. The method of claim 1, wherein the first replication policy specifies multiple destination resources, and wherein each of the selected follower objects is replicated on the multiple destination resources.

7. The method of claim 1, wherein the anchor object is a holder for the first replication policy.

8. The method of claim 1, wherein the destination resource comprises at least one of a server, a hard drive, a virtual memory, a database, a random access memory (RAM), and a cache memory.

9. The method of claim 1, further comprising storing an identifier of the destination source with the anchor object for use by another data object, wherein the another data object is different from the plurality of follower objects.

10. The method of claim 1, wherein the detecting the data object comprises:
    examining a link associated with the data object, wherein the link indicates that the data object follows the anchor object.

11. The method of claim 1, wherein the factor comprises at least one of data names, data owners, locations, data functions, storage capacities, transfer capacities, or security data of the follower objects.

12. A system comprising:
    a memory; and
    a processor operatively coupled to the memory, the processor to:
       identify an anchor object comprising a first replication policy;
       evaluate the first replication policy to determine a destination resource;
       detect data object associated with the anchor object, wherein the data object comprises a second replication policy;
       define an additional replication policy for the data object to indicate that the data object is to follow the anchor object and that the data object is to be replicated on the destination source, wherein the additional replication policy is different from the second replication policy and the first replication policy;
       identify, in view of the additional replication policy, a plurality of follower objects that follow the anchor object, the follower objects comprising the data object;
       order the follower objects in view of at least one factor to determine an order of the follower objects;
       select one or more of the follower objects in view of the order; and
       replicate the selected follower objects on the destination resource in view of the additional replication policy.

13. The system of claim 12, the processor to:
    replicate the anchor object on the destination resource in view of the additional replication policy.

14. The system of claim 12, wherein to identify the anchor object, the processor is to:
    identify an object in the storage network; and
    designate the object as the anchor object.

15. The system of claim 12, the processor to:
    generate a notification indicating the destination resource; and
    provide the notification to a user.

16. The system of claim 12, wherein to identify the plurality of follower objects, the processor is to: examine a lookup table related to the additional replication policy.

17. The system of claim 12, wherein the first replication policy specifies multiple destination resources, and wherein each of the selected follower objects is replicated on the multiple destination resources.

18. The system of claim 12, wherein the anchor object is a holder for the first replication policy.

19. The system of claim 12, wherein the destination resource comprises at least one of a server, a hard drive, a virtual memory, a database, a random access memory (RAM), or a cache memory.

20. The system of claim 12, the processor to store an identifier of the destination source with the anchor object for use by another data object, wherein the another data object is different from the plurality of follower objects.

21. The system of claim 12, wherein, to detect the data object, the processor is further to examine a link associated with the data object, wherein the link indicates that the data object follows the anchor object.

22. The system of claim 12, wherein the factor comprises at least one of data names, data owners, locations, data functions, storage capacities, transfer capacities, or security data of the follower objects.

* * * * *